Figure 5:
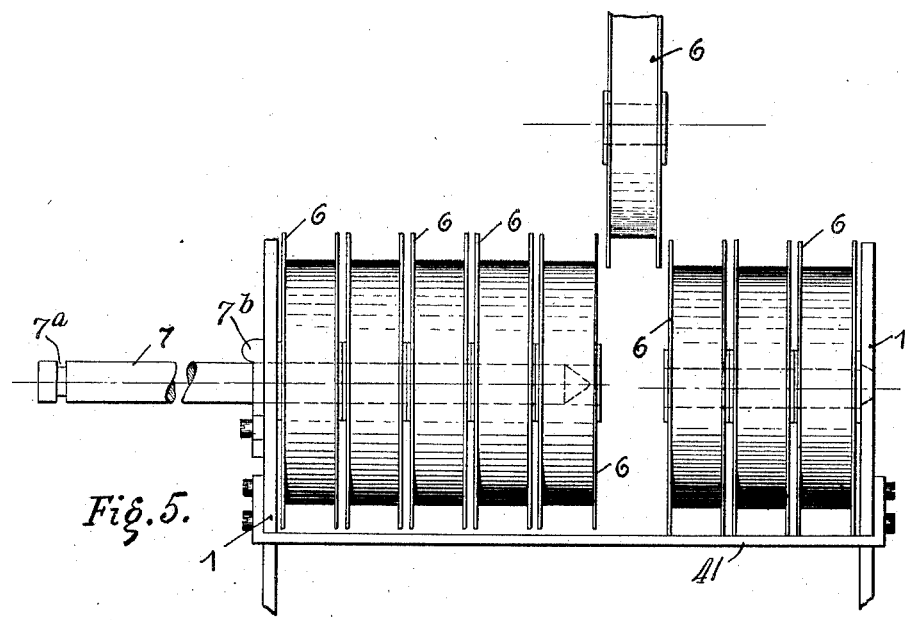

H. ISSELHORST & H. ANGERSTEIN.
STAMP FEEDING AND AFFIXING DEVICE.
APPLICATION FILED APR. 26, 1909.
1,081,270.
Patented Dec. 9, 1913.
11 SHEETS—SHEET 1.
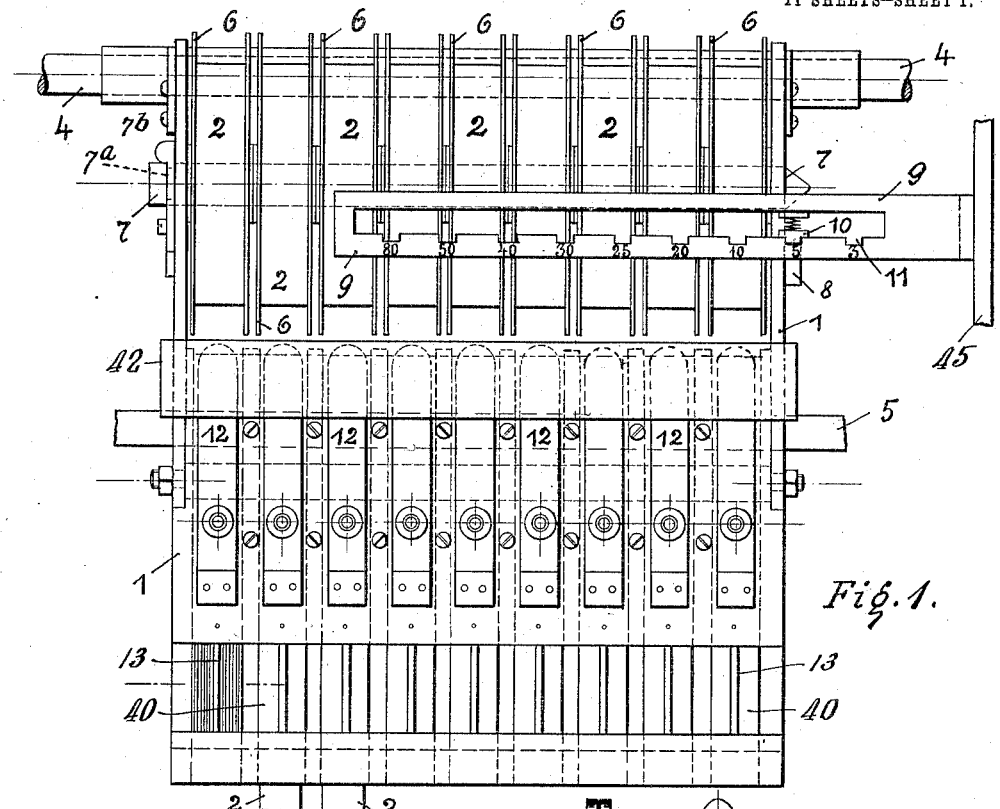
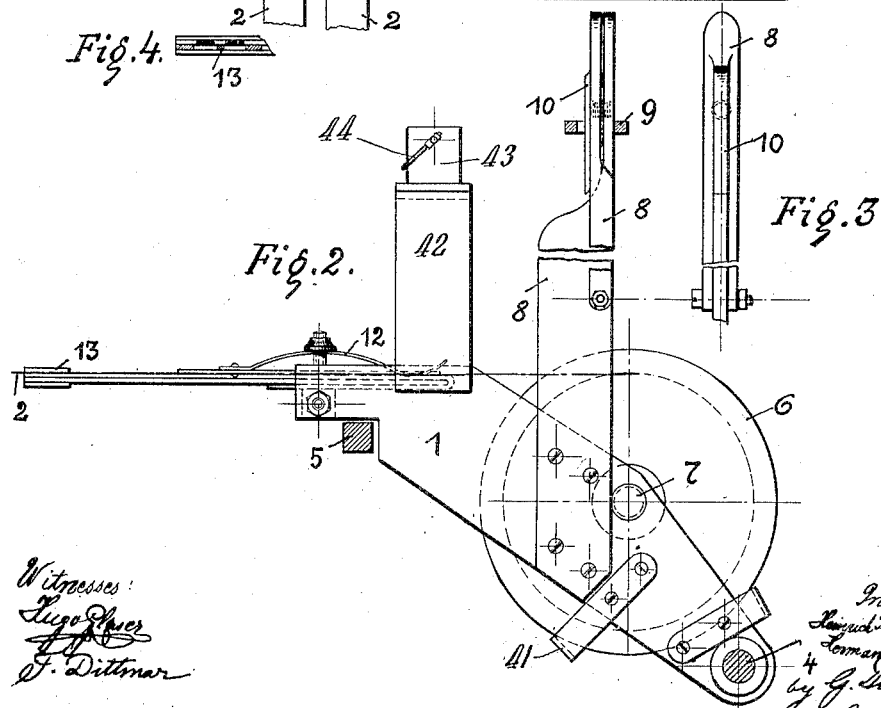

H. ISSELHORST & H. ANGERSTEIN.
STAMP FEEDING AND AFFIXING DEVICE.
APPLICATION FILED APR. 26, 1909.

1,081,270.

Patented Dec. 9, 1913.
11 SHEETS—SHEET 2.

Witnesses:
Hugo Haas
F. Dittmar

Inventors:
Heinrich Isselhorst
and Hermann Angerstein
by G. Dittmar
Attorney

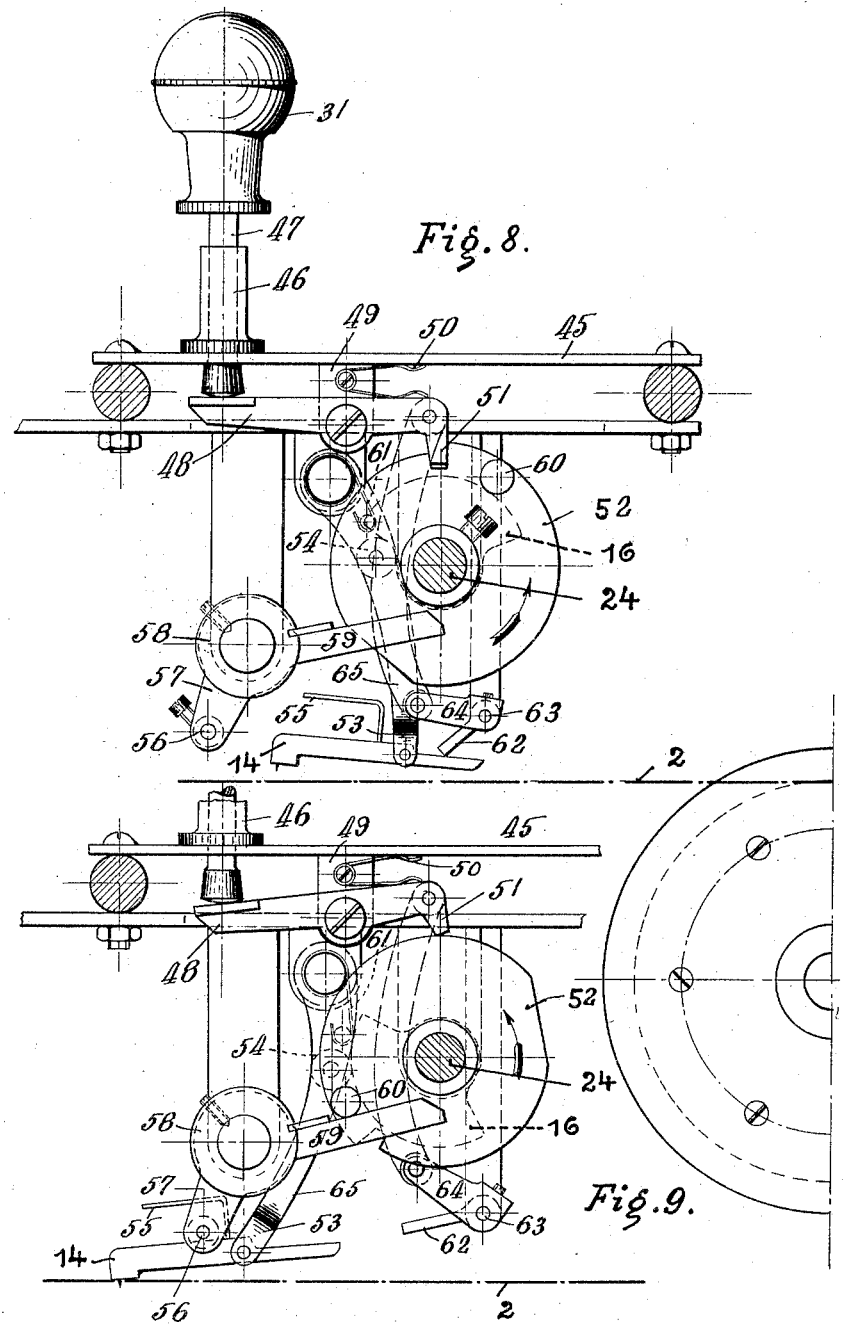

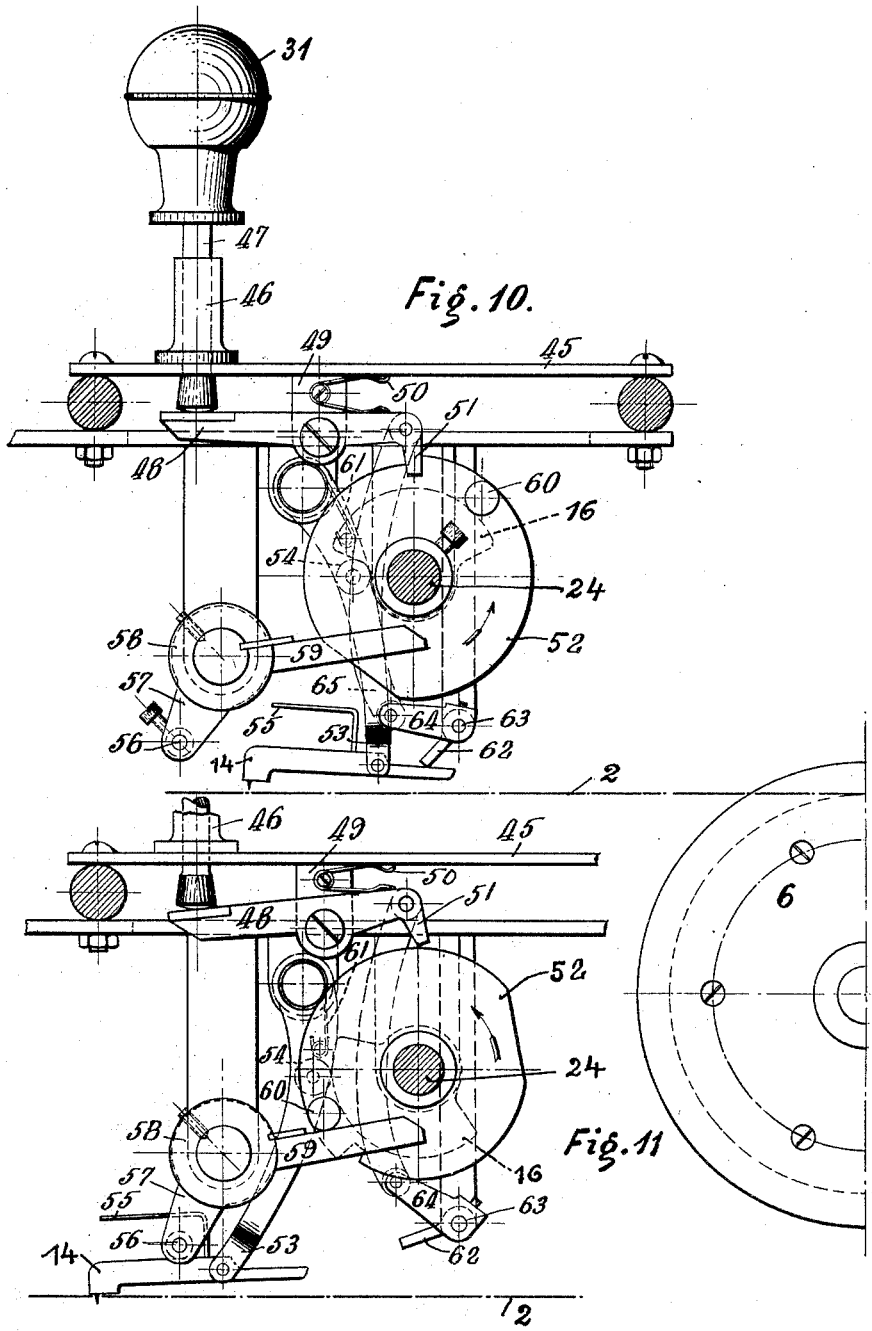

H. ISSELHORST & H. ANGERSTEIN.
STAMP FEEDING AND AFFIXING DEVICE.
APPLICATION FILED APR. 26, 1909.

1,081,270.

Patented Dec. 9, 1913.
11 SHEETS—SHEET 5.

H. ISSELHORST & H. ANGERSTEIN.
STAMP FEEDING AND AFFIXING DEVICE.
APPLICATION FILED APR. 26, 1909.
1,081,270.
Patented Dec. 9, 1913.
11 SHEETS—SHEET 6.
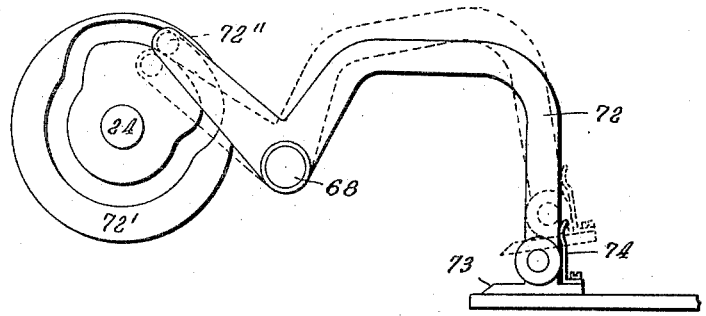
Fig. 29.
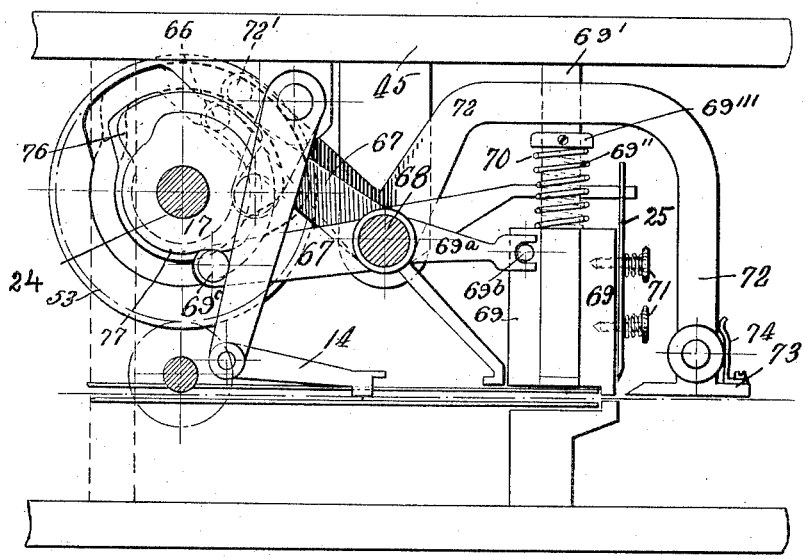
Fig. 27.    Fig. 15.
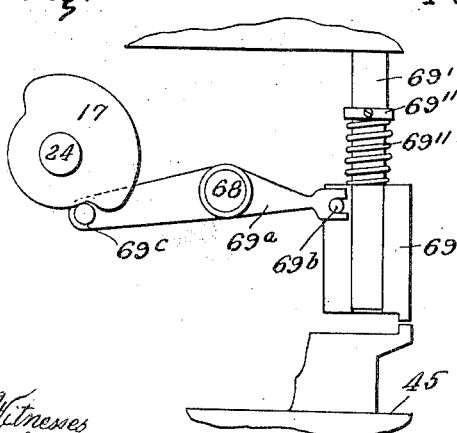
Fig. 28.
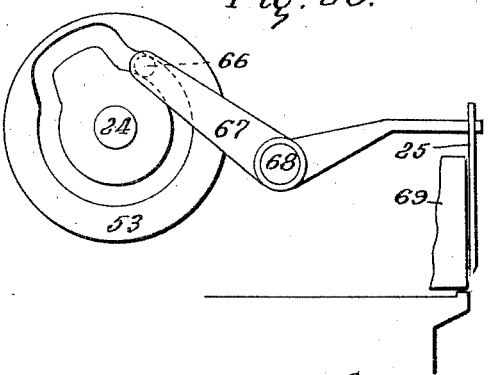

H. ISSELHORST & H. ANGERSTEIN.
STAMP FEEDING AND AFFIXING DEVICE.
APPLICATION FILED APR. 26, 1909.

1,081,270.

Patented Dec. 9, 1913.
11 SHEETS—SHEET 7.

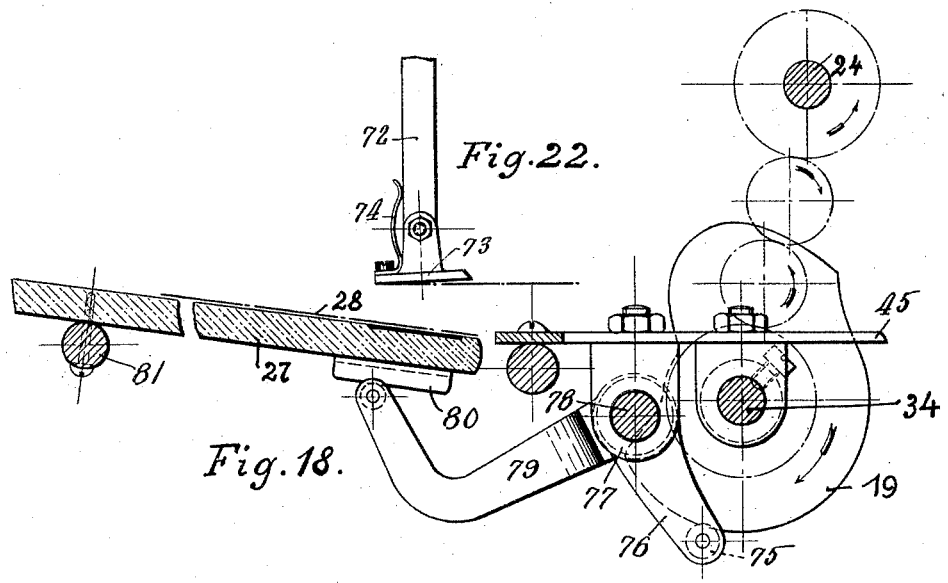
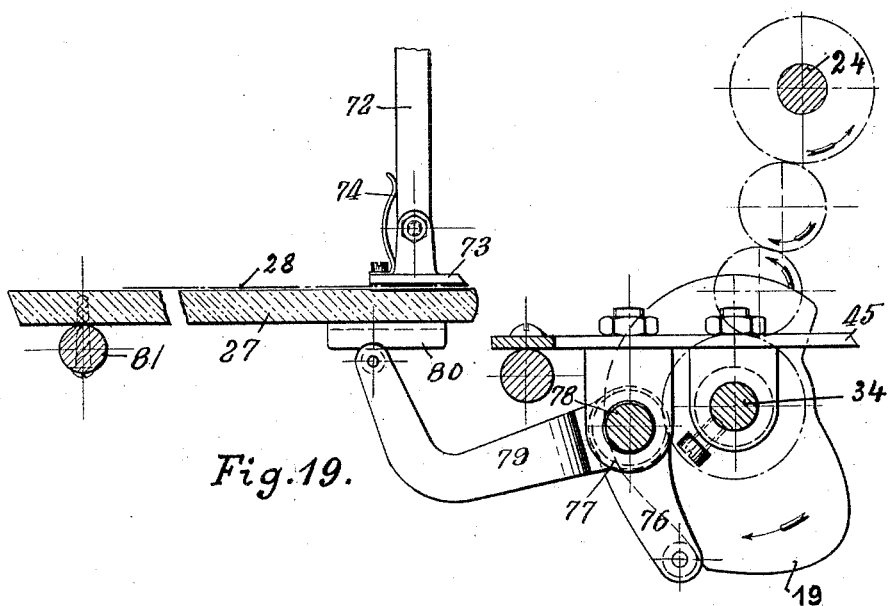

H. ISSELHORST & H. ANGERSTEIN.
STAMP FEEDING AND AFFIXING DEVICE.
APPLICATION FILED APR. 26, 1909.
1,081,270.
Patented Dec. 9, 1913.
11 SHEETS—SHEET 9.
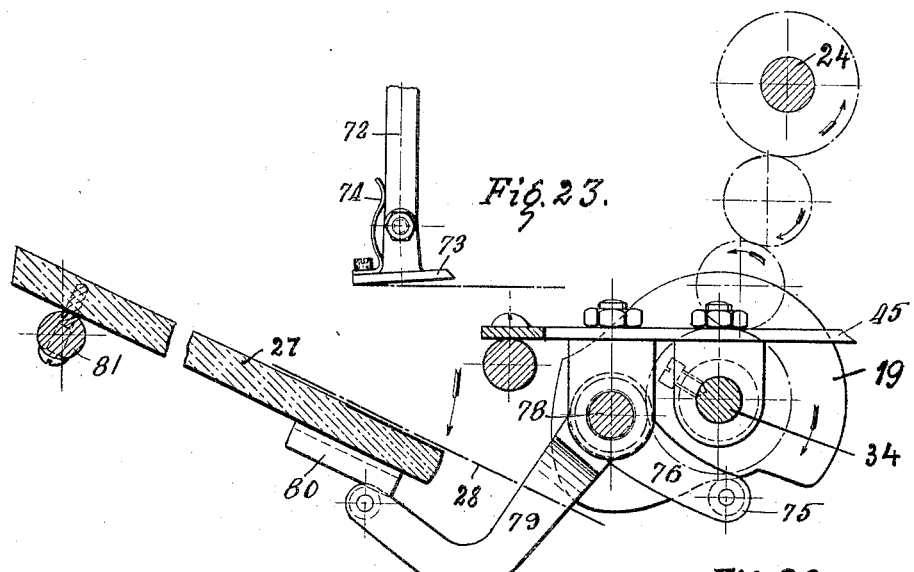
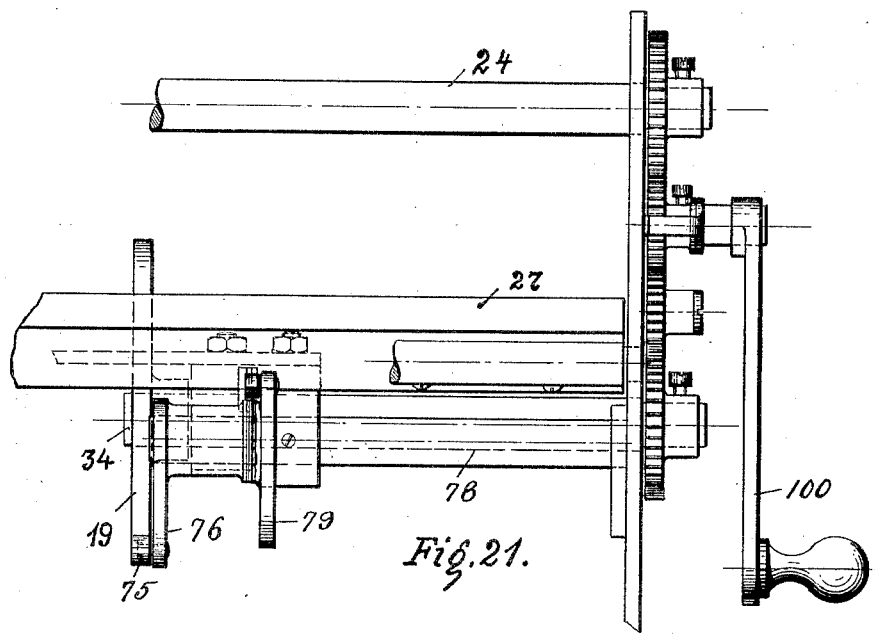

H. ISSELHORST & H. ANGERSTEIN.
STAMP FEEDING AND AFFIXING DEVICE.
APPLICATION FILED APR. 26, 1909.

1,081,270.

Patented Dec. 9, 1913.
11 SHEETS—SHEET 10.

UNITED STATES PATENT OFFICE.

HEINRICH ISSELHORST, OF BIELEFELD, AND HERMANN ANGERSTEIN, OF BERLIN, GERMANY.

STAMP FEEDING AND AFFIXING DEVICE.

1,081,270. Specification of Letters Patent. Patented Dec. 9, 1913.

Application filed April 26, 1909. Serial No. 492,417.

*To all whom it may concern:*

Be it known that we, HEINRICH ISSELHORST and HERMANN ANGERSTEIN, subjects of the Emperor of Germany, residing at Bielefeld, Germany, and Berlin, Germany, respectively, have invented certain new and useful Improvements in Stamp Feeding and Affixing Devices, of which the following is a full, clear, and exact specification.

The present invention relates to stamp affixing mechanism for applying postage and other stamps to envelops, and the like, and has for its principal object to provide an improved stamp-feeding mechanism for use in conjunction with the affixing mechanism.

Another important object of this invention is to provide a machine which will affix stamps to letters made up during the day in a business office, will record the number of the stamps, and will collect the letters in a closed compartment or drawer from which they may be removed only by an authorized person. The advantage derived from this feature of the invention is, that the various letters of a business office may be stamped as soon as made up during the day and deposited in a locked compartment where they will be protected from handling and will be collected together for mailing.

The invention comprises, broadly, a stamp-affixing machine provided with a strip-feeding mechanism and a carrying mechanism for stamps differing in value, the mechanisms being adjustable relative to one another to bring the feeding mechanism and the carrying mechanism into registration with one another to feed the desired stamp, the invention specifically comprising a frame having a stamp-affixing mechanism provided with a fixed stamp-strip guide and a device for feeding the strip into the guide. The frame also carries a knife adapted to sever the stamps from the strip, one at a time, and means for applying the severed stamps to envelops, or the like, registering the number of the stamps used. A safety drawer or compartment is associated with the affixing mechanism to receive the envelops after the stamps have been affixed thereto, the envelops being supported upon a tilting table during the application of the stamps and being then dropped into the compartment by the tilting of the table. Coöperating with this mechanism is a carriage carrying a number of stamp-strip reels arranged detachably side by side in the carriage to support a number of stamp-strips varying in value. The carriage is slidably mounted on the frame to move laterally and bring the desired stamp-strip reel into registry with the fixed guide so that a stamp of the desired value may be fed into the affixing mechanism. The carriage has also a way for each reel into which the free end of the stamp-strip is inserted for directing the strip into the guide, the ways being open at their upper sides throughout a considerable length to admit of the engagement of the feeding device against the strip when the latter is in registration with the fixed guide. The main frame of the machine carries a fixed angle bar having a longitudinal slot in one arm and a series of notches communicating with the slot and corresponding in number to the stamp-strip reels. The carriage is provided with an adjusting arm which is fixed thereto for moving the carriage laterally, the arm being provided with a pawl adapted to engage in the notches of the angle bar and lock the carriage in position when adjusted.

Various other objects and advantages of this invention will be pointed out in the following specification disclosing one embodiment of the invention.

Figure 7:
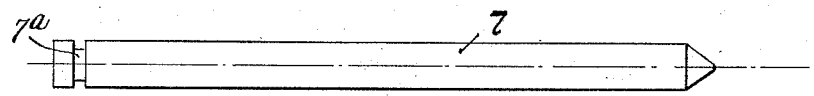
Figure 6:
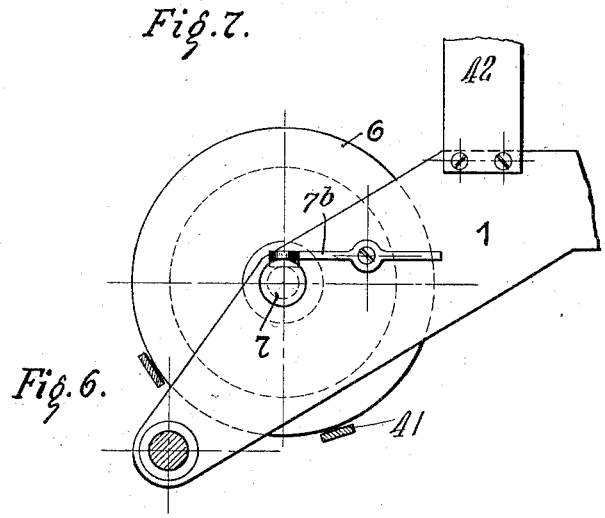
Figure 12:
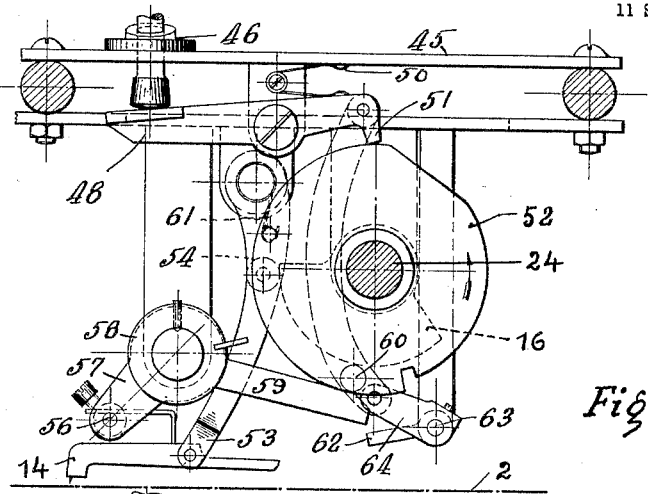
Figure 13:
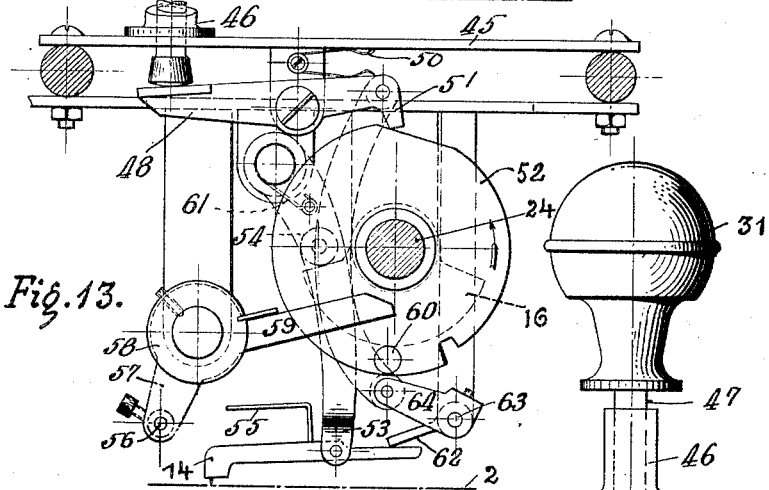
Figure 14:
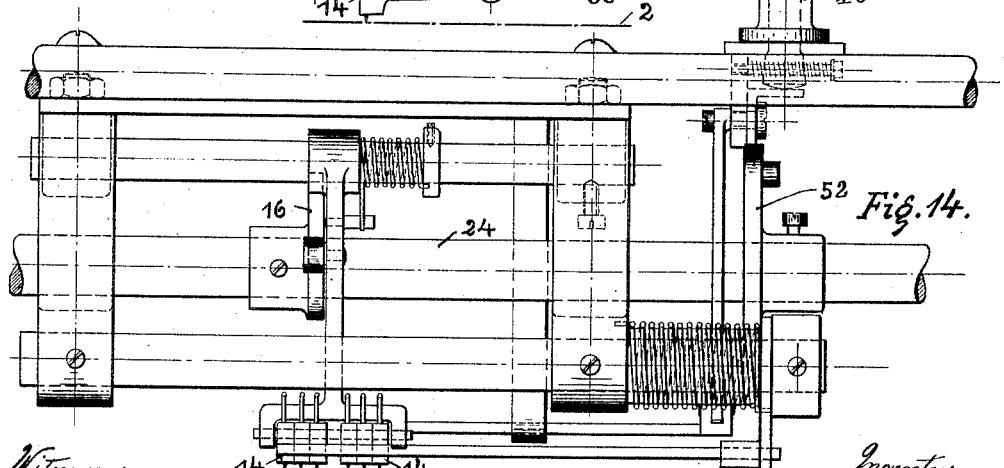
Figure 16:
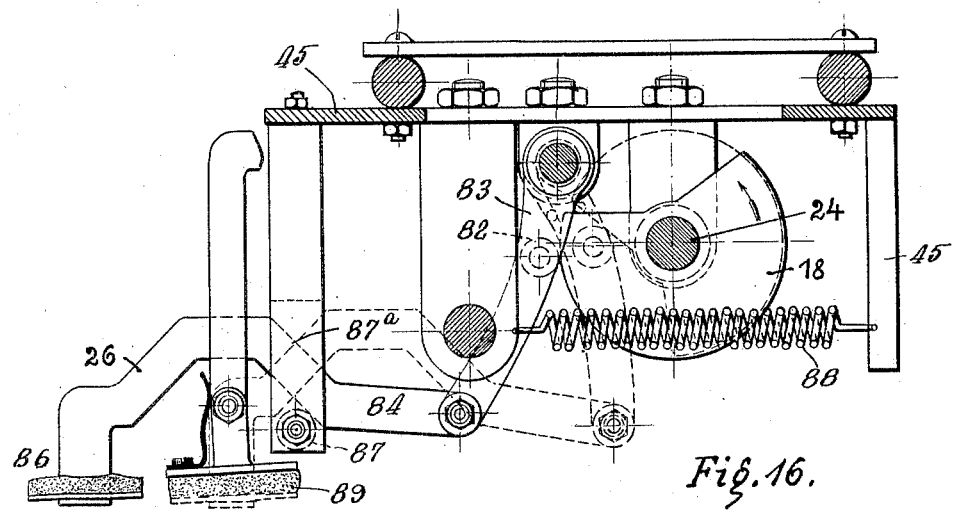
Figure 17:
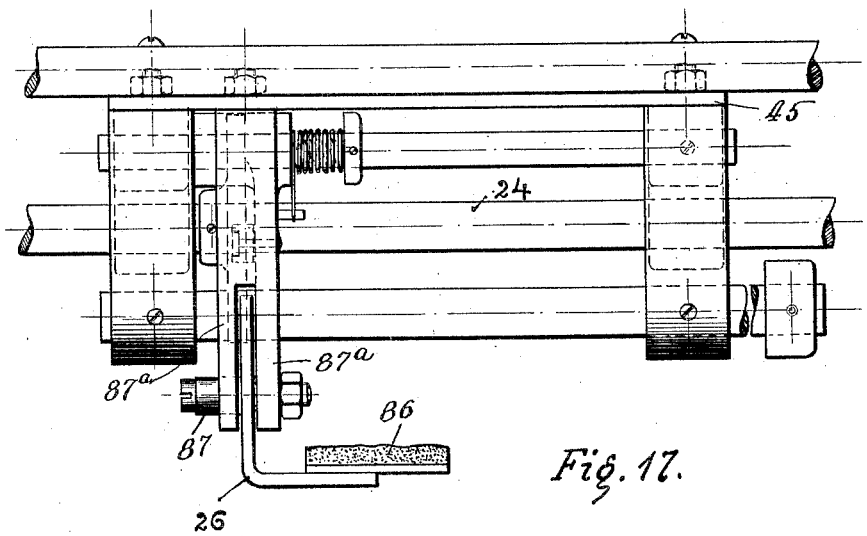
Figure 24:
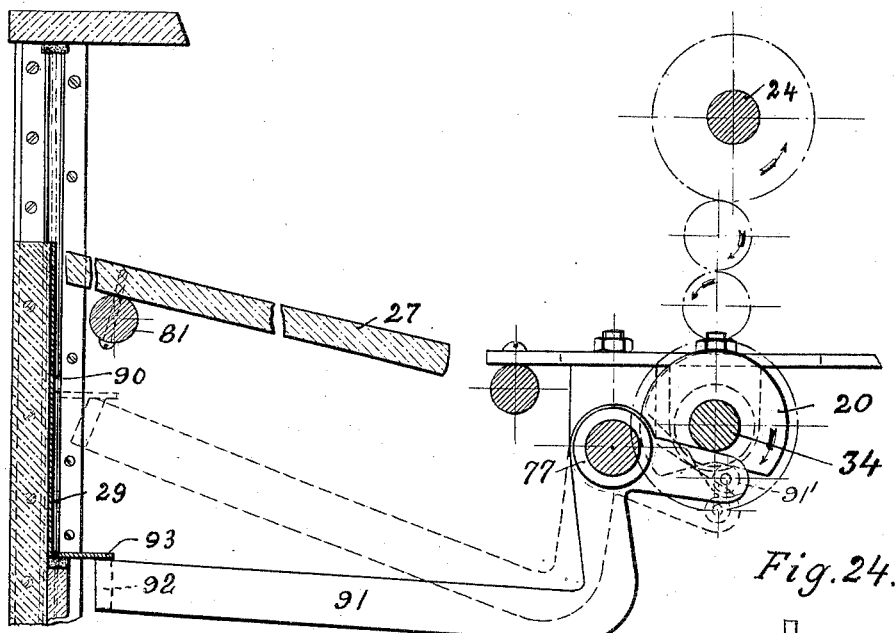
Figure 25:
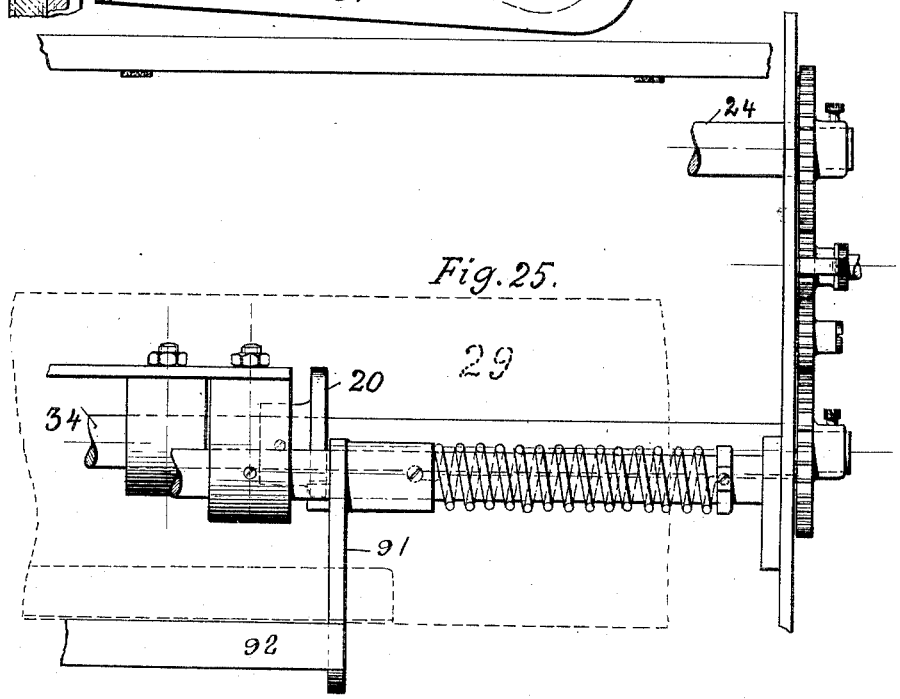
Figure 26:
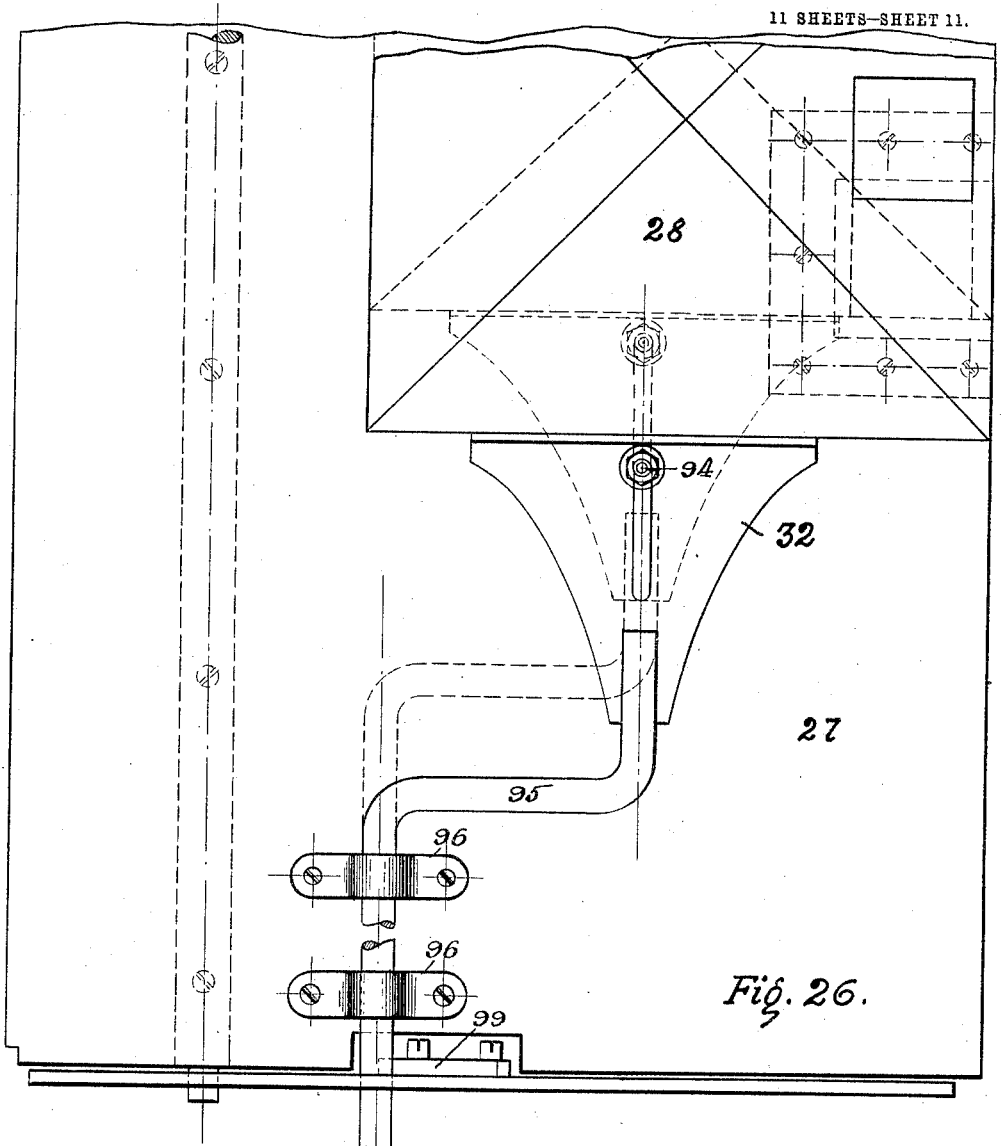

In the drawings, Figure 1 is a top plan view of the stamp-strip carriage and its adjacent parts; Fig. 2 is a side elevation of the same; Fig. 3 is a detail view of the carriage-adjusting arm; Fig. 4 is a cross-sectional view of one of the strip-ways of the carriage; Fig. 5 is a detail plan view of the carriage frame showing one of the reels removed; Fig. 6 is an end view of the same; Fig. 7 is a detail view of the removable shaft for supporting the reels; Fig. 8 is a detail view of the strip-feeding device in locked or inoperative position; Fig. 9 is a similar view disclosing the pawl of the device in engagement with a stamp-strip immediately after moving the same forward; Fig. 10 is a view of the same showing the pawl about to engage the stamp-strip; Fig. 11 is a similar view showing the pawl about to be raised from the stamp-strip after feeding the same forward; Fig. 12 is a rear view showing the pawl in its raised position immediately after advancing the strip; Fig. 13 is a similar view showing the pawl retracted and partially raised; Fig. 14 is a front elevation of the strip-feeding device; Fig. 15 is a side elevation of the cutting mechanism; Fig. 16 is a side elevation of the moistening mechanism; Fig. 17 is a front elevation of the same; Fig. 18 is a side elevation, partly in section, of the affixing mechanism showing the tilting table in raised position for receiving an envelop; Fig. 19 is a similar view showing the table raised against the presser-plate to apply the stamp; Fig. 20 is a rear view showing the table tilted to permit the envelop to slide therefrom; Fig. 21 is a front elevation of the tilting mechanism for the table; Figs. 22 and 23 are side views of the presser-plate, and its support; Fig. 24 is a side elevation of the sliding door and its mechanism which controls the letter insert slot; Fig. 25 is a front elevation of the same, the tilting table being removed; Fig. 26 is a top plan view of the envelop-adjusting device for effecting the application of additional stamps to the envelop.

The improved machine is disclosed as being provided with an adjustable carriage, the carriage comprising a frame 1, substantially rectangular in form and having the side bars thereof supported at an inclination upon bars 4 and 5, carried upon the main frame of the machine. The frame 1 carries a transverse shaft 7 slidable through a suitable bearing in one of the side bars of frame 1, the shaft 7 being pointed at its opposite end to provide a conical bearing member adapted to seat in a correspondingly formed bearing in the opposite side bar. The bearing member is conical in form to prevent the passage of the shaft 7 through the opposite side bar. An annular groove 7ª is formed adjacent to the inner end of the shaft 7, into which engages a hinged latch 7ᵇ carried upon the side of the frame 1 and adapted to hold the shaft 7 from displacement. Within the frame 1 and upon the shaft 7 are disposed a plurality of reels 6 independently mounted upon the shaft 7 and adapted to be interchanged as desired. The reels 6 carry stamp-strips 2 which are fed into the machine through a corresponding number of ways 40 which are mounted upon the upper end of the inclined frame 1, the ways 40 lying in a horizontal plane. The ways are provided with upwardly opening sides throughout practically their entire length, and springs 12 are mounted over the inner ends of the ways and extend down through the open sides thereof for engagement against the stamp-strips to hold the same taut and prevent the warping of the same. The outer ends of the ways 40 are joined by upper and lower cross-strips 13 which close the upper sides of the ways and hold the strips therein. The upper edge of the frame 1 is recessed to provide a bearing shoulder for engagement with the bar 5 to support the frame 1 and admit of its sliding longitudinally upon the bar. The lower end of the frame 1 is formed of a sleeve secured at its ends in the lower extremities of the side bars of the frame, the sleeve slidably engaging about the rounded bar 4 and admitting of the longitudinal sliding of the frame upon the rod 4. A cross-brace 41 of U-form is secured at its ends to the side bars of the frame and engages across the under-side of the frame beneath the reels 6 so as to reinforce the frame and hold the side bars in parallelism. The frame 1 is provided with an upstanding bracket 42 extending across the upper end of the frame and carrying a plurality of registers 43 corresponding to the number of stamp-strips and having operating arms 44 extending outwardly therefrom and adapted to operate the same.

The main frame 45 of the machine carries an upstanding angle-bar 9, the long arm of which engages inwardly over the carriage and is provided with a longitudinal slot for the reception of an upstanding arm 8 fixed upon the carriage, the bar 9 having a series of notches corresponding to the number of reels upon the carriage for the reception of a spring-pressed pawl 10 mounted upon the fixed arm 8 to lock the carriage when it is brought into the desired position.

The main frame of the machine is provided midway of its ends with a bushing 46 through which is slidably disposed a plunger rod 47 carrying a suitable handle 31 upon its upper end, the lower end of the rod 47 projecting downwardly into the machine and bearing against the outer end of a locking pawl 48. The pawl 48 is hinged upon a depending lug 49 and is yieldingly pressed against the plunger 47 under the action of a spring 50 interposed between the frame 45 and the inner end of the pawl 48. The inner end of the pawl 48 is provided with a depending detent 51 engaging in a notch formed in the periphery of a disk 52 fixed upon the main operating shaft 24. Arranged immediately beneath the pawl 48 and the disk 52 is the feeding device for the stamp strips. This device comprises a hinged arm 53 adapted to swing in a vertical plane having a forked lower extremity in which is pivoted a pawl 14 adapted to drop into the open side of the way 40 which is brought into registration with the feeding device and grip the stamp-strip to feed the same. For this purpose the pawl 14 is preferably provided with a number of depending pins at its free end to engage in the perforations of the stamp-strip. The arm 53 is moved forwardly to push the pawl 14 therewith by a cam 16 fixed to the shaft 24 which engages the roller 54 projecting laterally from the arm 53. In Fig. 10 the cam 16 is disclosed in position about to engage the roller 54, the arm 53 being swung rearwardly into normal position. In Fig. 11 it will be noted that the cam 16 is supporting the roller 54 and holding the arm 53 away from the shaft 24, the feeding pawl 14 being in its forward position. The pawl 14 is provided with one or more overhanging fingers 55 which extend forwardly and engage over a rod 56 carried upon a depending lug 57. The lug 57 is carried upon a sleeve 58 having a rearwardly-projecting arm 59 located adjacent to the disk 52. Projecting laterally from the disk 52 is a pin 60 moving in the path of the arm 59 and adapted to strike the same at predetermined intervals to swing the arm 59 down, partially rotate the sleeve 58 and lift the rod 56. The upward movement of the rod 56 raises the overhanging fingers 55 and lifts the forward end of the pawl 14 away from the stamp strip 2. In this manner the pawl 14 is released from the strip and held in such position until the arm 53 is released by the cam 16 and moved back into normal position by the spring 61. For the purpose of holding the outer end of the pawl 14 up from the strip 2 when in normal position a lug 62 is mounted upon the frame immediately below the disk 52 and is fixed upon a rod 63 rotatably mounted in the frame and rocked by an arm 64, which extends forwardly from the same. The arm 64 is connected by a link 65 to the inner end of the locking pawl 48, the detent 51 of which moves over the periphery of the disk 52 and holds the arm 64 up to raise the lug 62 from the pawl 14. The lug 62 bears against the rear end of the pawl 14 and holds the forward end thereof from the strip 2 until the plunger 47 rocks the pawl 48 and raises the detent 51 from the notch in the disk. It will be observed that the disk 52 is given a slight cam-shape so as to raise the detent 51 into its highest position as the arm 53 returns the pawl 14 to its normal backward position.

The shaft 24 is provided with a path cam 53 receiving a roller 66 carried upon the free end of a cutter arm 67 suitably hinged upon the shaft 68 in the frame 45. The forward end of the cutter arm 67 carries a cutting knife 25 yieldingly held against a supporting block 69 by springs 70 adjustably held against the cutter-blade 25 by set screws 71. The shaft 68 is further provided with a presser-plate arm 72 which is arched upwardly and extends at its outer end down in front of the cutter-blade 25, the arm 72 hingedly carrying upon its lower forward end a presser-plate 73. A leaf-spring 74 is mounted upon the forward portion of the presser-plate 73 and bears against the end of the arm 72 to hold the presser-plate at a downwardly inclined angle at its forward end. Thus when the presser-plate arm 72 is moved down against the envelop while affixing the stamp, the presser-plate 73 assumes an angular position corresponding to the upper face or side of the envelop or packet and automatically adjusts itself to the unevenness of the upper face of the packet to fit snugly thereagainst and effect the proper application of the stamp to the envelop. Movement is imparted to the presser-plate arm 72 by a second path cam 72' mounted upon the shaft and receiving a roller 72'' carried in the rear end of the arm 72 beyond the shaft 68. The block 69 also serves the purpose of clamping the stamp-strip 2 from movement during the action of the cutter 25. The block 69 is mounted for sliding vertical movement upon a post 69' carried in the frame 45 and is normally urged downward by a helical spring 69'' arranged about the post 69' and adjustably held against the top of the block 69 by a set collar 69'''. The shaft 68 is provided with an arm 69$^a$ forked at its outer end and engaging about a stud or pin 69$^b$ carried upon the block 69. A roller 69$^c$ is mounted upon the inner end of the arm 69$^a$ and engages the periphery of a cam 17 carried upon the shaft 24. The cam 17 is of such peculiar form and is so mounted in the machine as to hold the block 69 up from the strip 2 during the feeding action, and to release the block 69 for engagement with the strip 2 during the moistening and applying operations.

Forwardly of the cutting mechanism and slightly below the same is journaled a transverse shaft 34 in the frame 45 which is geared to the main shaft 24. The shaft 34 is provided with a cam 19, against the periphery of which contacts a roller 75 disposed upon the extremity of an arm 76 depending from a sleeve 77 rotatably mounted upon a stub shaft 78 arranged slightly forward of the shaft 34. The sleeve 77 carries an angle-arm 79 carrying a roller in its extremity bearing against the run-way 80 disposed upon the under-side of a tilting table 27 arranged for operation immediately beneath the presser-plate 73. The table 27 is fixed upon the oscillating rod 81 disposed in the frame 45 at the forward end thereof, the table 27 being of considerable size to support envelops and the like of various dimensions. The presser-plate 73 is of a size sufficient only to cover the stamp severed from the stamp-strip 2. The presser-plate 73 is arranged over the tilting table 27 at the point of application of the stamp to the envelop disposed upon the table. The cam 19 is of such peculiar form that it swings the arm 76 at a predetermined period of time in the operation of the machine to raise the table 27 into the angle disclosed in Fig. 18 to receive the envelop, and to press the envelop 28 upwardly against the presser-plate 73 as is disclosed in Fig. 19. Further operation of the cam lowers the free end of the table 27 into the position disclosed in Fig. 20, whereupon the envelop 28 slides from the table down into the bottom of the frame.

The frame 45 is provided with a moistening means for the stamps during the cutting of the same from the strip 2 preparatory to their engagement with the envelop. This mechanism comprises a cam 18 disposed upon the shaft 24 and bearing at its periphery against a roller 82 carried at an intermediate point upon a rocking arm 83. The arm 83 is hingedly connected at its free end to a substantially horizontally movable bar 84 provided near its outer end with an upwardly arched portion providing inclined opposite inner faces. The outer or free end of the bar 84 is supported upon a roller 87 which engages against the inclined opposite faces and swings the outer end of the bar vertically as the same is reciprocated by the arm 83, since the roller 87 bears against the opposite inclined faces. The roller 87 is mounted in a support 87$^a$ depending from the upper portion of the frame 45 the support 87$^a$ as shown in Fig. 17 of the drawings being vertically slotted for the reception of the bar 84 and to admit of its vertical movement. The outer end of the arm 84 extends down below the horizontal plane of the arm and carries thereat a moistener 86 preferably in the form of an absorbent pad adapted to be moved back and forth and vertically by the arm 84. This moistening mechanism is so located in the machine that the moistener 86 is moved by the arm 84 into contact against the underside of the presser-plate 73 and is drawn up against the underside of the same by the backward movement of the arm 83 which draws the inclined inner face of the arched portion 26 against the outer side of the roller 87. The moistener 86 is thus adapted to engage the underside of the stamp prior to the pressing of the plate 73 against the envelop.

The frame 45 is provided at its forward end with a vertically movable slide 90 closing an opening in the frame through which letters and packets are inserted when they are to be stamped. This machine is provided with an improved mechanism for automatically closing this slide when the table 27 is tilted so that a letter can only be inserted for stamping when the table 27 is in proper position to receive the letter. This improved mechanism comprises an angle arm 91 extending inwardly from a sleeve 77 and provided with a lateral projection or engagement 92 at its outer end adapted to bear against the lip 93 turned inwardly from the lower edge of the slide 90. As the machine begins its operation after a letter has been inserted, the cam 20 engaging the roller 91' of the arm 91 raises the outer end of the arm 91 and brings the projection 92 against the lip 93, and upon further movement raises the slide 90 to close the opening through the frame. It is designed to provide a drawer or other suitable inclosure in the lower end of the frame of the machine and to lock the same so that access can be had thereto only by authorized persons.

In Fig. 26 is disclosed the top plan view of a portion of the tilting table 27 upon which the end of an envelop 28 is supported. The dotted lines indicate the position of the envelop when the stamp is affixed thereto, while the solid lines show the position of the envelop when an additional stamp is applied to the same. The table 27 is provided with a gage plate 32 against which the edge of the envelop rests to register the corner of the same immediately beneath the presser-plate 73. The gage plate 32 has a longitudinal central slot through which projects a guiding pin 94 admitting of the lateral adjustment of the plate upon the table. An adjusting rod 95 is connected to the outer end of the gage plate 32 and passes slidably through suitable straps 96 upon the tilting table and projects outwardly beyond the edge of the table and upon which is mounted a suitable handle 97. A notch 98 is formed in the rod 95 for engagement with a locking tooth 99 carried upon the table 27, so as to hold the gage plate 32 in adjusted position.

From the foregoing description it will be seen that when it is desired to apply a stamp to an envelop, the envelop is inserted through a forward opening in the frame 45 and placed upon the tilting table 27. The operator now depresses the plunger 47 to raise the detent 51 from the notch in the disk 52 and at the same time rotates the shaft 24 through the medium of the crank arm 100. Prior to the introduction of the envelop into the machine the carriage carrying the stamp-strips is adjusted laterally upon the bars 4 and 5 by the arm 8 to bring the desired stamp-strip into registration with the pawl 14. As the shaft 24 rotates, the detent 51 raises the link 65 and rocks the arm 64 to raise the lug 62 from the rear end of the pawl 14. This operation admits of the dropping of the pawl 14 down through the open side of the registering way 40 and the pins upon the pawl engage in the perforations of the strip 2. Simultaneous with this engagement of the pawl 14, or immediately thereafter, the cam 16 engages the roller 54 and moves the arm 53 forwardly, pushing the pawl 14 and feeding the strip 2 from its reel 6 toward the cutting and affixing devices. As soon as the arm 53 reaches the end of its forward movement the pin 60 strikes the arm 59 and raises the lug 57 with the rod 56. The rod 56 swings the forward end of the pawl 14 upwardly to release the stamp-strip 2 through the medium of the fingers 55. The shaft 24 rotates the cam 20 and swings the long end of the arm 91 upwardly to engage the lip 93 and close the slide 90, and holds the slide in such closed position until the complete cycle of operations of the mechanism is completed and the machine is in condition to receive the next envelop or packet. The stamp-strip 2 is forced against the inclined presser-plate 73 and the end stamp of the strip rests immediately thereagainst. As soon as the pawl 14 is released from the strip 2 the cam 18 throws the arm 83 forwardly to swing the bar 84 away from the moistening pad 89 and, by engagement with the roller 85, the bar 84 holds the moistener 86 upwardly against the stamp located immediately beneath the presser-plate 73. The cam 18 now releases the arm 83 and the bar 84, and thereby returns the moistener 86 into its normal position. The cam 19, at this period of the operation of the machine swings the arm 76 to raise the table 27 into the position disclosed in Fig. 18, or at a slight inclination beneath the presser-plate 73. As the moistener 86 is withdrawn from the presser-plate, the cam 19 swings the table 27 up against the presser plate and the presser plate 73 itself is moved slightly downward by the action of the cam so as to apply the stamp to the envelop 28 which is carried upon the table. While the stamp is held between the presser plate 73 and the envelops on the table 27, the cam 53 rocks the arm 67 and brings the cutter blade 25 down to sever the stamp from the strip. As the cam 53 continues in its movement the arm 67 is actuated to raise the cutter 25 from the strip, and the cam 72' moves the arm 72 to raise the presser plate 73 from the stamp strip. A further movement of the cam 19 releases the arm 76 and admits of the dropping of the table 27 into its lowermost position, as is disclosed in Fig. 20, whereupon the envelop 28 slides from the tilting table into the lower portion of the machine.

We claim—

1. In a stamp-feeding and affixing device, the combination with stamp-affixing means, of a series of stamp reels arranged side by side in a row, means for effecting a relatively lateral adjustment between said stamp-affixing means and said stamp reels to bring any reel of the series in line with the stamp-affixing means, and locking means for the stamp-affixing means and the row of stamp reels adapted to interlock the reels to the affixing means when the same are adjusted.

2. In a machine of the character described, a stamp-affixing mechanism, a stamp-feeding mechanism, a laterally adjustable carriage movable relative to said stamp-feeding mechanism, and a series of stamp-strip carrying reels arranged side by side in a row on the carriage and being adapted to be brought one at a time into line with said stamp-feeding mechanism.

3. In a stamp-feeding and affixing machine, a stamp-affixing mechanism, a stamp-feeding mechanism, a manually adjustable carriage associated with the feeding mechanism, a plurality of stamp strip reels carried upon the carriage and adapted to be brought one at a time into register with said stamp-feeding mechanism, and means for locking said carriage to said feeding mechanism when adjusted whereby to prevent movement of the carriage during the operation of the feeding mechanism.

4. In a stamp-feeding and affixing machine, a stamp-affixing mechanism, a stamp-feeding mechanism associated with the affixing mechanism, a laterally adjustable carriage, a plurality of stamp strip reels arranged side by side in a row on the carriage, a plurality of ways one for each stamp strip reel mounted on the carriage, and means for laterally moving the carriage whereby to bring any one of said ways into register with the feeding mechanism.

5. In a stamp-feeding and affixing device, a stamp-affixing mechanism, a stamp-feeding mechanism stationary relative to the affixing mechanism, a laterally movable carriage associated with the feeding mechanism, a series of stamp strip reels arranged in a row upon said carriage, a corresponding series of ways extending from the reels and mounted on said carriage, and means for effecting a lateral movement of the carriage to bring any one of said ways into register with said feeding mechanism.

6. In a stamp-feeding and affixing device, and in combination, a stamp-feeding mechanism, a carriage movable laterally beneath the feeding mechanism, independent reels disposed in the carriage and adapted to carry stamp-strips differing in value, a stamp-affixing mechanism a plurality of ways mounted on the carriage and leading to the stamp-affixing mechanism and receiving the free ends of the stamp-strips, said ways having open upper sides to receive the feeding mechanism, and tension devices associated with the ways for engagement with the stamp-strips to yieldingly hold the same in the ways.

7. In a stamp-feeding and affixing device, and in combination, a stamp-affixing mechanism, a stamp-feeding mechanism associated with the affixing mechanism, and a stamp-supply device for coöperation with the feeding mechanism, said supply device including a carriage movable laterally with respect to the feeding mechanism, stamp-strip supporting reels disposed in the carriage, ways disposed upon the carriage receiving the ends of the stamp-strips, the ways being open at their upper sides for the reception of the feeding mechanism when brought into registration therewith, means for moving the carriage to the desired adjustment, and locking means for the carriage to secure the same in position when adjusted.

8. In a stamp-affixing and feeding machine, and in combination, a stamp-affixing mechanism, a stamp-feeding mechanism associated with the affixing mechanism, and means for supplying stamps to the feeding mechanism, said means comprising an adjustable carriage adapted to support a number of stamp-strips differing in value, the carriage having ways carrying the ends of the strips adapted to be brought singly into registration with the feeding mechanism.

9. In a machine of the character described, an affixing mechanism, a feeding mechanism associated with the affixing mechanism, a stamp-supplying mechanism coöperating with the feeding mechanism, said supplying mechanism including an adjustable carriage adapted to support a number of stamp-strips differing in value, ways arranged upon the carriage to receive the free ends of the strips, and locking means for the carriage to hold the same in position when adjusted with respect to the feeding mechanism.

10. A stamp-feeding and affixing device having in combination a stamp-affixing mechanism, a stamp-supply device, and a stamp-feeding mechanism arranged between the supply device and the affixing mechanism, said feeding mechanism including a longitudinally movable pawl for engagement with the stamps, and means for raising the pawl out of engagement with the stamps at the opposite ends of the stroke of the same.

11. A stamp-feeding and affixing device including a stamp-affixing mechanism, a stamp-supply device, and means for feeding stamps from the supply device to the affixing mechanism, said means including a swinging arm, a pawl pivoted upon the end of the arm for engagement with stamps to carry the same forward upon the swinging of the arm, and lifting means for the pawl at the opposite ends of its stroke.

12. In a stamp-feeding and affixing device and in combination, an affixing mechanism, a supply device, and means for feeding the stamps from said supply device to said affixing mechanism, said means including a swinging arm, a pawl pivoted upon the end of the arm and adapted for engagement with the stamps to move the same forwardly, lifting means for the pawl when in its forward position, and other lifting means for the pawl to hold the same normally above the stamps when retracted.

13. In a stamp-feeding and affixing device, and in combination, a stamp-affixing mechanism, a stamp-supply device, and means for feeding the stamps from said supply device to said affixing mechanism, said means including a swinging arm, a pawl hinged upon the lower end of said arm and adapted for engagement with the stamps from said supply device, a lifting rod arranged forwardly of said pawl to lift the latter from the stamps at the end of its forward stroke, and a lug rearwardly of said arm for engagement with the pawl at the end of its rearward stroke to hold the same normally up from the stamps.

14. A stamp-feeding and affixing device comprising a stamp-affixing mechanism, a stamp-feeding mechanism, a stamp-supply device adapted to carry a plurality of stamps differing in value, means for moving said stamp-supply device relative to said stamp-feeding mechanism whereby the desired stamps are brought into line with the stamp-feeding mechanism, a presser-plate for the reception of the stamps from the feeding mechanism, a moistener movable against the stamps disposed against the presser-plate, and a stamp-severing mechanism arranged immediately behind the presser-plate adapted to sever the stamp subsequent to the moistening of the same.

15. A stamp-feeding and affixing device, a stamp-feeding mechanism, a supply device associated with the feeding mechanism, a presser-plate adapted to receive the stamp from the feeding mechanism, a tilting table operable beneath the presser-plate and adapted to receive an envelop to be stamped thereon, a moistening device for engagement with the stamps beneath the presser-plate, means for moving said tilting table up against the stamps and the presser-plate, and a cutting mechanism operable upon the stamps subsequent to the upward movement of the tilting table.

16. In a device of the character stated, a movable frame, rollers therein for carrying the strips of stamps of different values, a removable shaft, and means whereby said rollers are made interchangeable, means for adjusting said rollers according to the valued strip to be fed, and slideways for guiding said stamps to the sticking mechanism.

17. In a device of the character stated, a frame slidingly mounted on suitable supports, rolls carried by said frame and adapted for stamp strips of different values, a removable shaft permitting of exchanging the rolls, a vertically disposed lever on one side of the frame by which the whole frame with the rolls may be adjusted, said lever being provided with a spring actuated pawl, and an angle iron relatively fixed and having notches with which said pawl is adapted to engage.

In testimony whereof we affix our signatures.

HEINRICH ISSELHORST. [L. S.]
HERMANN ANGERSTEIN. [L. S.]

In the presence of—
OSKAR KÜNZELL,
OTTO KÖNIG.

Copies of this patent may be obtained for five cents each, by addressing the "Commissioner of Patents, Washington, D. C."